United States Patent [19]

Spratt

[11] Patent Number: 5,044,505

[45] Date of Patent: Sep. 3, 1991

[54] EQUIPMENT STORAGE FRAME

[76] Inventor: James V. Spratt, 24511 - 140th Ave. S.E., Kent, Wash. 98042

[21] Appl. No.: 204,384

[22] Filed: Jun. 9, 1988

[51] Int. Cl.$^5$ .............................................. A47F 7/00
[52] U.S. Cl. ...................................... 211/22; 211/13; 211/189
[58] Field of Search .................... 211/22, 17, 20, 70.5, 211/13, 187, 206, 189; 248/125, 231.6, 218.4, 219.3, 302

[56] References Cited

U.S. PATENT DOCUMENTS

| | | |
|---|---|---|
| 491,475 | 2/1893 | Elliott . |
| 506,675 | 10/1893 | Devore . |
| 706,718 | 8/1902 | Bradbury . |
| 1,380,570 | 6/1921 | Lehman .......................... 211/193 X |
| 1,409,228 | 3/1922 | Marshall ......................... 211/206 X |
| 2,778,588 | 1/1957 | Capocci ........................... 248/302 X |
| 3,111,723 | 9/1959 | Bates ................................... 20/4 |
| 3,153,526 | 10/1964 | Pawsey .......................... 248/302 X |
| 3,221,678 | 12/1965 | Doherty .......................... 211/187 X |
| 3,499,541 | 3/1970 | Mackie ............................ 211/206 X |
| 3,503,525 | 3/1970 | Loebner .............................. 211/206 |
| 3,570,798 | 3/1971 | Squibb ............................ 211/187 X |
| 3,794,227 | 2/1974 | Sterns ............................. 224/42.01 |
| 4,219,142 | 8/1980 | Macpherson ....................... 224/324 |
| 4,371,082 | 2/1983 | Hostert et al. .................... 211/20 X |
| 4,552,270 | 11/1985 | Lentz et al. ........................... 211/17 |
| 4,813,550 | 3/1989 | Saeks ..................................... 211/17 |

FOREIGN PATENT DOCUMENTS 0071532 2/1983 European Pat. Off. ............ 211/206
1510828 12/1967 France ................................. 211/193

OTHER PUBLICATIONS

IBM Technical Disclosure Bulletin, Aug. 1971.

Primary Examiner—Alvin C. Chin-Shue
Assistant Examiner—Sarah A. Lechok
Attorney, Agent, or Firm—Lee E. Johnson

[57] ABSTRACT

An equipment storage frame (10) having elongated supports (12) mountable between an upper surface (14) and lower surface (16) with adjustable beam clamps (22) mounted thereon. The beam clamps (22) hold support members (24) of various configurations at selected positions on the frame (10) to support bicycles (28) and other sports equipment. The frame (10) may be free-standing with the use of horizontal legs (36) and adjustable extensions (31). Wire supports clamps (44, 46, 50, 52), a flat plate (92), a cushioned support arm (49), a clamp fitting (128) and a matrix web (120) may all be attached to the frame (10) for storing large, bulky, and odd-shaped pieces of equipment in confined spaces with little or no alteration to the existing structure.

3 Claims, 3 Drawing Sheets

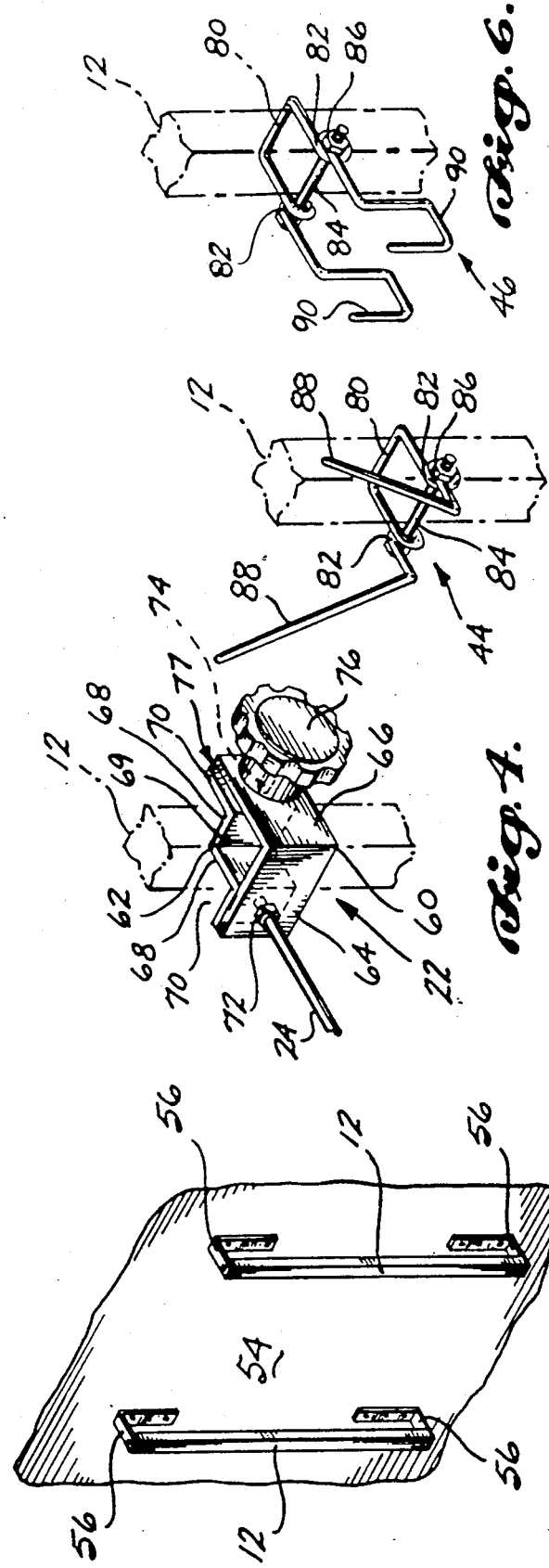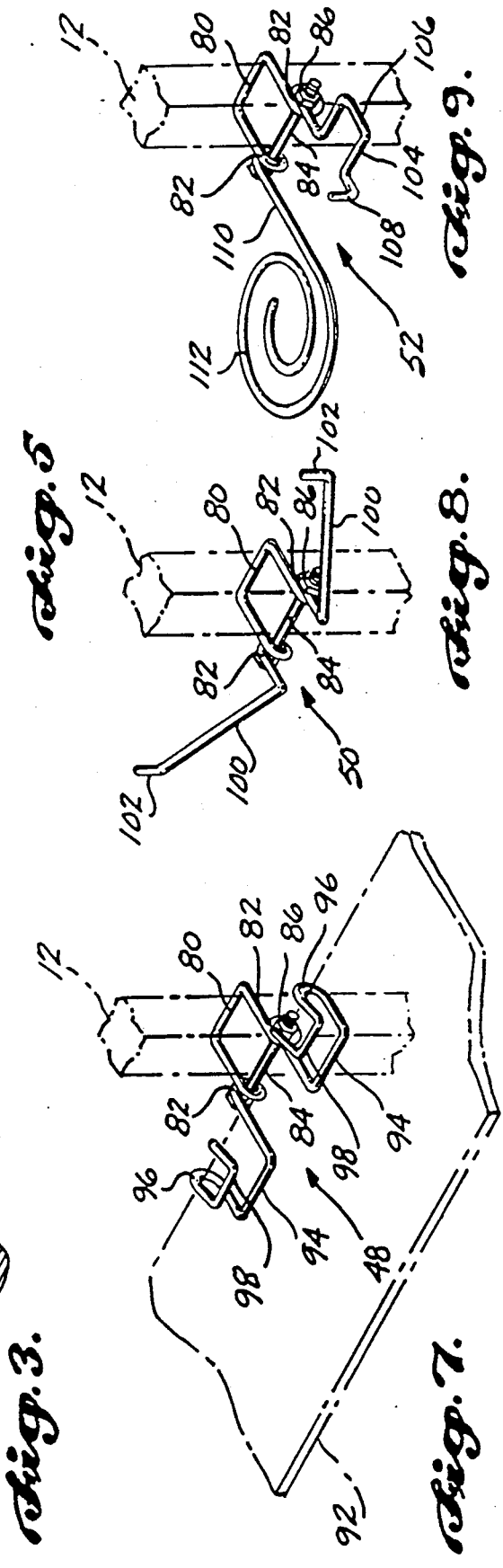

EQUIPMENT STORAGE FRAME

This invention pertains to storage frames and, more particularly, to storage frames for storing large, bulky or odd-shaped pieces of equipment.

BACKGROUND OF THE INVENTION

Traditional shelving storage does not readily accommodate large, bulky, or odd-shaped pieces of equipment. Objects such as backpacks, sleeping bags, saddles, helmets, etc., require more floor and shelf space than is available in most residences. Round items such as basketballs, softballs, footballs, etc., roll off shelves unless they are stored inside an additional container. Bicylces, skis, bats, etc., are too bulky to fit onto a shelf or store efficiently in a small space in a manner that allows them to be easily retrieved for use.

Tenants of condominiums, apartments, and offices are afforded little, if any, garage or storage space for equipment of the type described above. Adding additional shelves or conventional storage structures involves alterations to the dwelling that may not be permitted by the owner. Outdoor storage that is unprotected is not feasible because of possible damage from the weather or loss of the equipment by theft.

Thus, there is a need for storage structures designed to store large, bulky, and odd-shaped pieces of equipment, particularly such storage structures that can be installed without alteration of the dwelling that is to house the storage structure. The invention is intended to fill this need.

SUMMARY OF THE INVENTION

The present invention provides an equipment storage frame having a variety of storage clamps and brackets. The equipment storage frame includes at least two independent, upright elongated supports for mounting in compression between two fixed surfaces. More specifically, each elongated support includes a longitudinally fixed (bottom) foot attached at one end for bearing against one fixed surface; and, a longitudinally adjustable (top) foot attached at the other end of the elongated support to bear against the other of the fixed surfaces. Preferably, both feet are rotatable. The longitudinally adjustable top foot provides adjustment in the compressive pressure exerted by the elongated supports on the fixed surfaces. At least one horizontally projecting arm is mounted on the elongated support for supporting equipment. In addition, a horizontally and vertically adjustable beam clamp for mounting each arm on the elongated supports is provided. The elongated supports and the arms cooperate to support large pieces of equipment without requiring the use of cross supports to connect the elongated supports together.

In accordance with further aspects of this invention, a pair of brackets is provided. Each of the brackets has a first leg for attaching the bracket to a fixed structure and a second leg projecting substantially at a right angle from the first leg for attaching the bracket to the end of the elongated support to thereby mount the elongated support in spaced relationship to the fixed structure. This permits more permanent mounting of the equipment storage frame when such mounting is feasible.

In accordance with other aspects of this invention, an alternative embodiment of the equipment storage frame comprises at least two upright elongated supports located in parallel spaced relationship to each other, a horizontally adjustable lower cross support attached to each of the upright elongated supports, at least two telescoping legs projecting horizontally from the lower cross support with vertically adjustable feet projecting downward from the telescoping legs, and a horizontally adjustable upper cross support attached to the upright elongated supports. The lower cross support with legs and adjustable feet permits the equipment storage frame to stand alone.

In accordance with another aspect of this invention, an alternative embodiment of the equipment storage frame comprises a single upright support with a base foot to facilitate freestanding of the support. Any of the storage fittings can be used with the freestanding single upright support, making this useful in corners or closets.

In accordance with yet further aspects of this invention, the beam clamp comprises an L-shaped element and a W-shaped element. The W-shaped element is sized to fit between the legs of the L-shaped element. Further, the W-shaped element is configured such that when the outer surfaces of the outer legs of the W-shaped element face the inner surfaces of the legs of the L-shaped element, the inner legs of the W-shaped element and a portion of the legs of the L-shaped element define a hole suitable for encircling a beam. In addition, means for releasably attaching the outer legs of the W-shaped element to the legs of the L-shaped element is provided.

In accordance with still further aspects of this invention, a wire support clamp for clamping about the upright and/or cross supports is provided. The wire support clamp comprises a length of rigid wire including a U-shaped midregion, a first and second helically-shaped intermediate region located at either end of the U-shaped midregion, and first and second end regions located at each end of the helically-shaped intermediate region remote from the U-shaped midregion, and a tightening means for mounting through the spirally-shaped intermediate regions to tighten the clamp about the supports. The end regions of the wire support clamp may be formed in a variety of shapes, including an upright J-shape, an upright L-shape, a conical helix for supporting various pieces of equipment, and a multiplanar end region for supporting a flat plate or shelf.

As will be readily appreciated from the foregoing description, the invention provides an equipment storage frame having at least two upright elongated supports that mount in compression between two fixed surfaces, such as a floor and ceiling, that require no additional cross supports and are easily portable. In addition, the equipment storage frame may be more permanently mounted to a fixed surface such as a wall, by a pair of brackets. Alternatively, the equipment storage frame may stand along by means of telescoping legs and vertically adjustable feet. The variety of beam clamps and wire support clamps allows equipment of various sizes and shapes to be stored in a space-efficient manner on the frame and later be easily retrieved for use. Because the equipment storage frame is lightweight and portable, it is ideally suited for use in an office or residence because it requires no structural alterations and efficiently uses space.

BRIEF DESCRIPTION OF THE DRAWINGS

The foregoing and other features and advantages of the present invention will become better understood by reference to the following detailed description when taken in conjunction with the accompanying drawings wherein:

FIG. 3 is an isometric view of another alternative embodiment of the equipment storage frame formed in accordance with the invention having upright supports that are attachable to a fixed vertical structure, e.g., a wall;

FIG. 4 is an isometric view of a beam clamp formed in accordance with the invention and suitable for mounting on the equipment storage frames illustrated in FIGS. 1-3;

FIG. 5 is an isometric view of a wire support clamp formed in accordance with the invention having upright end portions and suitable for mounting on the equipment storage frames illustrated in FIGS. 1-3;

FIG. 6 is an isometric view of a wire support clamp formed in accordance with the invention having upright J-shaped end portions and suitable for mounting on the equipment storage frames illustrated in FIGS. 1-3;

FIG. 7 is an isometric view of a wire support clamp formed in accordance with the invention having multiplanar end portions and suitable for mounting on the equipment storage frames illustrated in FIGS. 1-3;

FIG. 8 is an isometric view of a wire support clamp formed in accordance with the invention having modified upright end portions and suitable for mounting on the equipment storage frames illustrated in FIGS. 1-3; and, FIG. 9 is an isometric view of a wire support clamp formed in accordance with the invention having a conical helix end portion and suitable for mounting on the equipment storage frames illustrated in FIGS. 1-3.

DESCRIPTION OF THE PREFERRED EMBODIMENT

Figure 1:
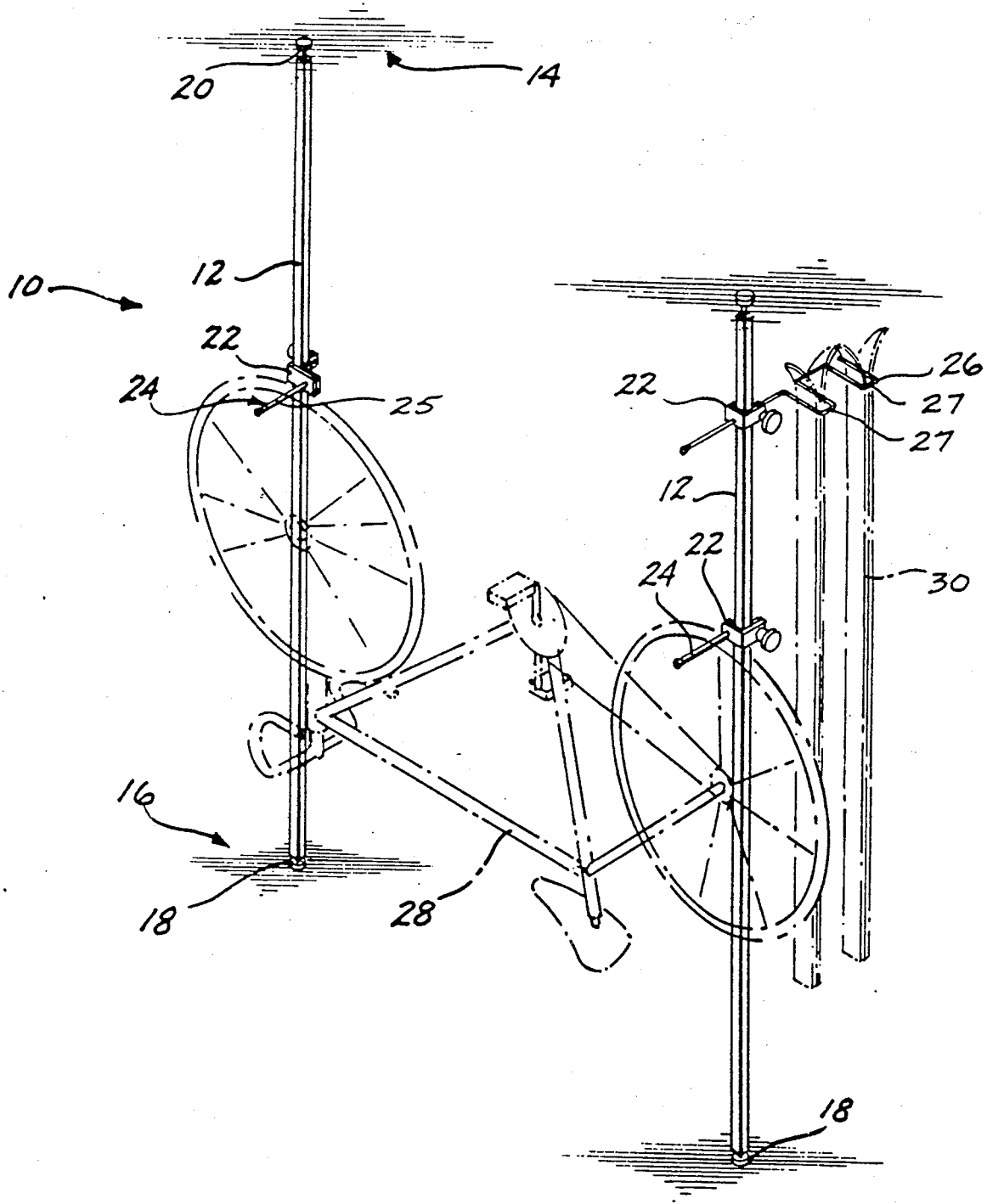
FIG. 1 is an isometric view of an equipment storage frame formed in accordance with the invention having upright supports that are compressibly mountable between two fixed surfaces.

FIG. 1 illustrates an equipment storage frame 10 formed in accordance with the invention that comprises a pair of spaced apart, independent, upright elongated supports 12 compressibly mounted between an upper surface 14 and a lower surface 16, indicated by shaded areas. A rotatable bottom foot 18 attached to the lower end of each of the elongated supports 12 presses against the lower surface 16, and a vertically adjustable, rotatable top foot 20 attached at the upper end of each of the elongated supports 12 presses against the upper surface 14. Compressive pressure is applied to the two surfaces 14 and 16 by rotating the vertically adjustable top foot 20 in the direction that extends the top foot 20. The main body of each of the elongated supports 12 has a square cross-sectional shape.

A plurality of beam clamps 22 are shown clamped to the elongated supports 12. Each beam clamp 22 has a support member 24 that projects horizontally outwardly. The support member 24 may be in the form of a straight rod 25 or may be bent to accommodate particular pieces of equipment, such as the ski rod 26 having two U-shaped portions 27 that each hold a pair of skis 30 by the tips. As will be better understood from the following description of the beam clamp 22 illustrated in FIG. 4, the beam clamps 22 are slidably adjustable along the elongated support 12 to permit adjustment of the vertical position or the directional orientation of the support member 24. Items are stored on the equipment storage frame 10 by resting or hanging them on the support members 24 that extend outwardly from the bracket clamps.

As will be appreciated from the foregoing description, the embodiment of the equipment storage frame 10 illustrated in FIG. 1 is ideal for storing large or bulky objects, such as a bicycle 28 or skis 30, without the need for any supporting cross structure. Because the slidably mounted beam clamps 22 may be vertically adjusted to any height along the elongated supports 12 this embodiment of the invention takes advantage of all available space.

Figure 2:
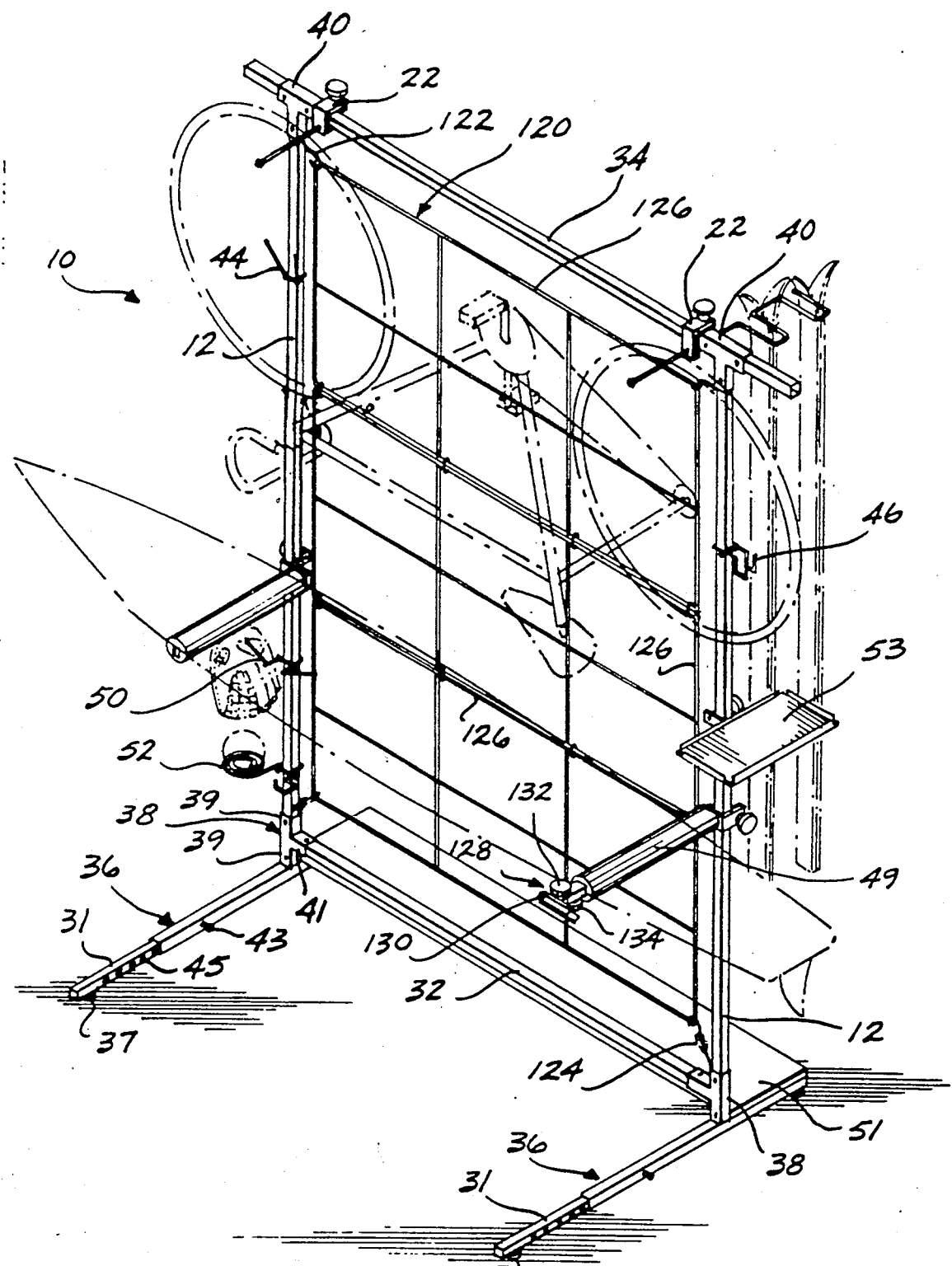
FIG. 2 is an isometric view of an alternative embodiment of an equipment storage frame formed in accordance with the invention having upright supports that include telescoping legs and vertically adjustable feet.

FIG. 2 illustrates an alternative embodiment of an equipment storage frame 10 formed in accordance with the invention. In FIG. 2, the elongated supports 12 are held in upright spaced relationship by a lower cross support 32, an upper cross support 34, and horizontal legs 36. Like the elongated supports 12, the lower cross support 32, the upper cross support 34, and the horizontal legs 36 have square cross-sectional shapes. Two three-way T-connectors 38 attach the lower cross support 32 and the horizontal legs 36 to the lower end of the elongated supports 12, and two three-way T-connectors 40 attach the upper cross support 34 to the upper end of the elongated supports 12. More specifically, each of the T-connectors include a pair of arms 39 that extend outwardly from a center section 41. The arms 39 and the center section 41 are hollow and have a square cross-sectional shape. The hollow arms 39 and center section 41 are sized to slidably receive the elongated supports 12 and the lower cross support 32. When assembled, the lower arm 39 slips over a nipple (not shown) projecting upward from the leg 36, the ends of the cross support 32 are slidably engaged within the center sections 41, and the supports 12 extend upwardly from the upper arms 39 of the T-connectors 38. The arms 39 and center sections 41 of the upper T-connectors 38 are hollow, have a square cross-sectional shape, and are sized to slidably receive the elongated supports 12 and the upper cross support 34. When assembled, the upper ends of the elongated supports 12 are slidably engaged in the arms 39 of the upper connectors 38 and the upper cross support 34 extends through the center sections 41 thereof. Crossbolts 43, such as hex-head bolts, extend through the T-connectors 38 to hold the frame members in place.

The elongated supports 12 are horizontally spaced apart at a distance determined by the length of the lower and upper cross supports 32 and 34—40 inches, for example. Because the upper and lower cross supports 32 and 34 are slidably engaged within their respective connectors 38, the horizontal distance between the elongated supports 12 can be adjusted to a limited degree—plus or minus six (6) inches, for example. Slidably adjustable extensions 31 extend forward from the horizontal legs 36 to aid in holding the frame 10 upright when large or bulky objects are supported thereon. Crossbolts 43 extend through each leg 36 and into a mating hole 45 in the extension 31 to hold the extension in place. Adjustable feet 37 are provided at the outer end of each horizontal leg 36 to maintain the equipment storage frame 10 in a substantially upright position and accommodate irregularities in the surface 16 on which the legs rest.

A matrix web 120 is supported between the elongated supports 12 by a pair of "S" hooks 122 attached near the top of the elongated supports 12 and a pair of springs 124 to provide tension on the matrix near the bottom of the elongated supports 12. The matrix web 120 preferably consists of ¼-inch diameter steel rod welded together with vertical and horizontal members to form a grid 126 consisting of six squares. As shown in FIG. 2, three grids 126 are hung from each other to form the matrix 120. Thus, the matrix 120 may be formed of one or more grids 126 hung from each other and supported between the elongated supports 12.

A clamp fitting 128 is slidably engageable in the end of the cushioned support arm 49. The fitting 128 includes a pair of adjustable jaws 130 that are clamped together or released by an adjusting knob 132. The clamp fitting 128 can be used to hold a bicycle 28 to facilitate repairs. The fitting 128 may be rotated about its horizontal axis by a clutch brake 134 that permits 360° clamping on a spindle (not shown). Beam clamps 22 with outwardly extending support rods 24 or cushioned support arms 49 and wire support clamps 44, 46, 48, 50, and 52 (described below) can be attached to the upper cross support 34 and the elongated supports 12 to provide a variety of supporting surfaces or structures for accommodating a variety of different sized and shaped objects. A lower shelf 51 rests on the legs 36 to provide a support for boots and the like. Likewise, a tray 53 is clamped to the elongated support 12 to hold tools or other small objects.

As can be appreciated from the foregoing description, the embodiment of the equipment storage frame 10 illustrated in FIG. 2, requires no alterations to existing structures or contact with any structure except the lower surface 16 on which it rests. The horizontal width is adjustable to suit individual storage needs, and the support clamps and wire supports are adjustable to maximize all available space.

A third alternative embodiment of an equipment storage frame 10 formed in accordance with the invention, is shown in FIG. 3. Specifically, FIG. 3 illustrates two elongated supports 12 securely mounted to a fixed structure, such as a wall 54, by four brackets 56. The brackets 56 are L-shaped and hold the elongated supports 12 both spaced apart and a spaced distance from the wall 54. More specifically, one leg of each L-shaped bracket is attached to the wall 54. The other legs extend outwardly from the wall. Each elongated support is vertically aligned and attached to opposite ends of the elongated supports 12. As in the embodiments described above, any combination of various crossbars, brackets, and clamps may be added to the elongated supports 12 illustrated in FIG. 3, to create an equipment storage frame 10 configured to suit individual needs.

FIG. 4 shows an enlarged view of a beam clamp 22 mounted on an elongated support 12 shown in phantom. The beam clamp 22 is comprised of an L-shaped element 60 and W-shaped element 62. The L-shaped element 60 is shaped to have a first leg 64 and a second leg 66 relatively normal to the first leg 64. The W-shaped element 62 has inner legs 68 and outer legs 70 formed at substantially right angles to each other. The two elements are placed together such that when the outer surfaces of the outer legs 70 of the W-shaped element 62 face the inner surfaces of the legs of the L-shaped element 60, the inner legs 68 of the W-shaped element 62 and a portion of the legs of the L-shaped element 60 define a square hole 69 sized to encircle the elongated support 12. The two elements are releasably clamped together by a threaded end of a support rod 24 and one or more nuts 72 that press the first leg 64 of the L-shaped element against one of the outer legs 70 of the W-shaped element 62 and by a carriage bolt 74 and threaded handle 76 that press the second leg 66 of the L-shaped element 60 against the other outer leg 70 of the W-shaped element 62. A gap 77 between the second leg 66 and the outer leg 70 allows clamping of the W-shaped element 62 and the L-shaped element 60 to be tightly clamped to a beam.

FIGS. 5 through 9 illustrate the various configurations of wire support clamps formed in accordance with the invention. Each of the wire support clamps is formed of a length of rigid wire and having a powder coating. Each wire support clamp has a U-shaped midregion 80 that is substantially rectangularly-shaped and sized to fit around three sides of the square shaped elongated supports 12. At both ends of the midregion 80 is a first and second helically-shaped intermediate region 82. Alternately, a flat washer with a hole can be welded to the wire. A bolt is mounted in the holes formed by the helically-shaped intermediate regions 82. The bolt spans the remaining side of the square shaped elongated supports. When a nut 86 mounted on the bolt is rotated so as to move toward the head of the bolt, the intermediate regions 82 are pulled toward one another and thereby clamp the wire support clamp to the elongated support 12. While the preferred tightening mechanism is a bolt 84 and a nut 86, if desired, other longitudinally movable tightening mechanisms can be used.

Each of the wire support clamps has a uniquely shaped end region located at the end of each of the intermediate regions 82. FIG. 5 shows wire support clamp 44 having substantially L-shaped end regions 88. One leg of the L-shaped end regions 88 lies in the plane defined by the U-shaped midregion 80. The other legs of the L-shaped end regions 88 project upwardly and can lie anywhere within a range from almost perpendicular to the longitudinal axis of the elongated supports 12 to substantially parallel to the longitudinal axis of the elongated supports 12.

FIG. 6 illustrates wire support clamp 46 having U-shaped end regions 90 lying in a plane orthogonal to the plane defined by the U-shaped midregion 80. While, as illustrated, ideally the plane of each of the U-shaped end regions 90 lies orthogonal to the plane of the U-shaped midregion 80, the plane of the U-shaped end regions 90 may lie within a range extending down to almost parallel to the U-shaped midregion 80. Further, rather than lying in a common plane, the legs of the U-shaped end regions 90 can lie in different planes.

FIG. 7 illustrates wire support clamp 48 designed to hold a flat plate 92 to act as a small shelf as if more clearly shown in FIG. 2. The wire support clamp 48 has a multiplanar end section beginning with a U-shaped section 94 that is substantially coincident with the plane defined by the U-shaped midregion 80. The end region then includes a J-shaped section 96 at the end of the U-shaped section 94 that lies in a plane orthogonal to the plane defined by the U-shaped section 94. The end region concludes with an L-shaped section 98 located at the end of the J-shaped section 96 and in a plane that overlies and is substantially parallel to the plane of the U-shaped section 94. Thus, the J-shaped sections 96 form a jar-like opening that allows a flat plate 92 to be inserted and rest upon the U-shaped section 94 and the L-shaped section 98 in a cantilevered arrangement.

FIG. 8 illustrates wire support clamp 50 having a first L-shaped end section 100 lying in a plane that lies transverse to the plane defined by the U-shaped midregion 80. More specifically, the L-shaped sections 100 project outwardly and upwardly away from one another, preferably at an angle 45° with respect to the shape defined by the U-shaped midregion 80. An arm 102 is located at the end of the first L-shaped section 100. The arm 102 and the outer leg of the first L-shaped section 100 form a second L-shaped section that lies in a plane orthogonal to the plane defined by the first L-shaped section 100. In addition, the axis of the arm 102 lies parallel to the longitudinal axis of the elongated support 12.

FIG. 9 illustrates wire support clamp 52 having a first end region 104 that includes a U-shaped section 106 that is coincident with the plane defined by the U-shaped midregion 80 and has an L-shaped section 108 located at the end thereof that lies in a plane orthogonal to the plane defined by the U-shaped section 106. In addition, wire support clamp 52 includes a second end region 110 that is helically-shaped and conical. The plane defined by the base 112 of the cone is coincident with the plane defined by the U-shaped midregion 80. The helically-shaped end region 110 is designed to hold a round object such as a ball, and can accommodate balls of different diameters such as basketballs, softballs, or golf balls. The first end region 104 of wire support clamp 52 is shaped to hold a baseball bat and glove.

The elongated supports 12, the upper and lower cross supports 32 and 34 and the horizontal legs 36 are preferably constructed of steel tubing having an ideal wall thickness of 0.065 inches. Square tubing having a width of 1¼ inches is preferred, although a rectangular-shaped beam of similar proportions may be used. A polyethylene or similar resilient coating is preferably applied to the steel tubing to protect it from scratching and chipping.

As can be appreciated from the foregoing description, the equipment storage frame 10 in combination with a variety of beam clamps 22 and wire support clamps 44, 46, 48, 50, and 52, avoid the crowding that results from layering objects on shelves and the difficulty in retrieving such items stored thereon. The present invention provides supports capable of holding a variety of objects in a space-efficient way. The equipment storage frame 10 is lightweight and easily portable, yet is constructed of high-strength steel and protected by a polyethylene coating.

While the preferred embodiments of the invention have been illustrated and described, it should be understood that variations apparent to those skilled in the art fall within the scope of the invention. For example, a single upright support can be supported on a stand that would be suitable for placing in a corner. The upright support would be supported on a stand similar to that shown in FIG. 2 having a crossbar 42 with horizontally extending legs 36 and extensions 31 having feet 37 thereon. The upright support would extend upward from the crossbar 42. Accordingly, the invention is not to be limited to the specific embodiments illustrated and described. Rather, the true scope and spirit of the invention are to be determined by reference to the following claims.

The embodiments of the invention in which an exclusive property or privilege is claimed are defined as follows:

1. An equipment storage frame comprising:
   (a) at least two independent, upright, elongated supports for mounting in compression between two fixed surfaces;
   (b) a bottom foot attached at one end of said elongated support for bearing against one of said fixed surfaces;
   (c) a longitudinally adjustable top foot attached at the other end of said elongated support to bear against the other of said fixed surfaces and provide adjustment in the compressive pressure exerted by the elongated support on the fixed surfaces;
   (d) at least one horizontally projecting arm mounted on said elongated support for supporting equipment;
   (e) a horizontally and vertically adjustable beam clamp for mounting each arm on each of said elongated supports, whereby said elongated supports and said arms cooperate to support large pieces of equipment without the use of cross supports connecting said elongated supports; and
   (f) a wire support clamp comprising:
      (i) a length of rigid wire, said length of rigid wire including:
         (1) a U-shaped midregion;
         (2) first and second helically-shaped intermediate regions, one located on either side of said U-shaped midregion; and
         (3) first and second end regions, one located on the end of each helically-shaped intermediate region remote from said U-shaped midregion; and
      (ii) tightening means mounted in the holes formed by said spirally-shaped intermediate regions for pulling said spirally-shaped intermediate regions toward one another.

2. The equipment storage frame of claim 1, wherein said U-shaped midregion of said wire support clamp is rectangularly shaped.

3. An equipment storage frame comprising:
   (a) a single upright, elongated support for mounting in compression between two fixed surfaces;
   (b) a bottom foot attached at one end of said elongated support for bearing against one of said fixed surfaces;
   (c) a longitudinally adjustable top foot attached at the other end of said elongated support to bear against the other of said fixed surfaces and provide adjustment in the compressive pressure exerted by the elongated support on the fixed surfaces;
   (d) at least one horizontally projecting arm mounted on said elongated support for supporting equipment;
   (e) a horizontally and vertically adjustable beam clamp for mounting said arm on said elongated support, whereby said elongated support and said arm cooperate to support pieces of equipment; and
   (f) a wire support clamp comprising:
      (i) a length of rigid wire, said length of rigid wire including:
         (1) a U-shaped midregion;
         (2) first and second helically-shaped intermediate regions, one located on either side of said U-shaped midregion; and
         (3) first and second end regions, one located on the end of each helically-shaped intermediate region remote from said U-shaped midregion; and
      (ii) tightening means mounted in the holes formed by said spirally-shaped intermediate regions for pulling said spirally-shaped intermediate regions toward one another.

* * * * *